Patented Jan. 21, 1930

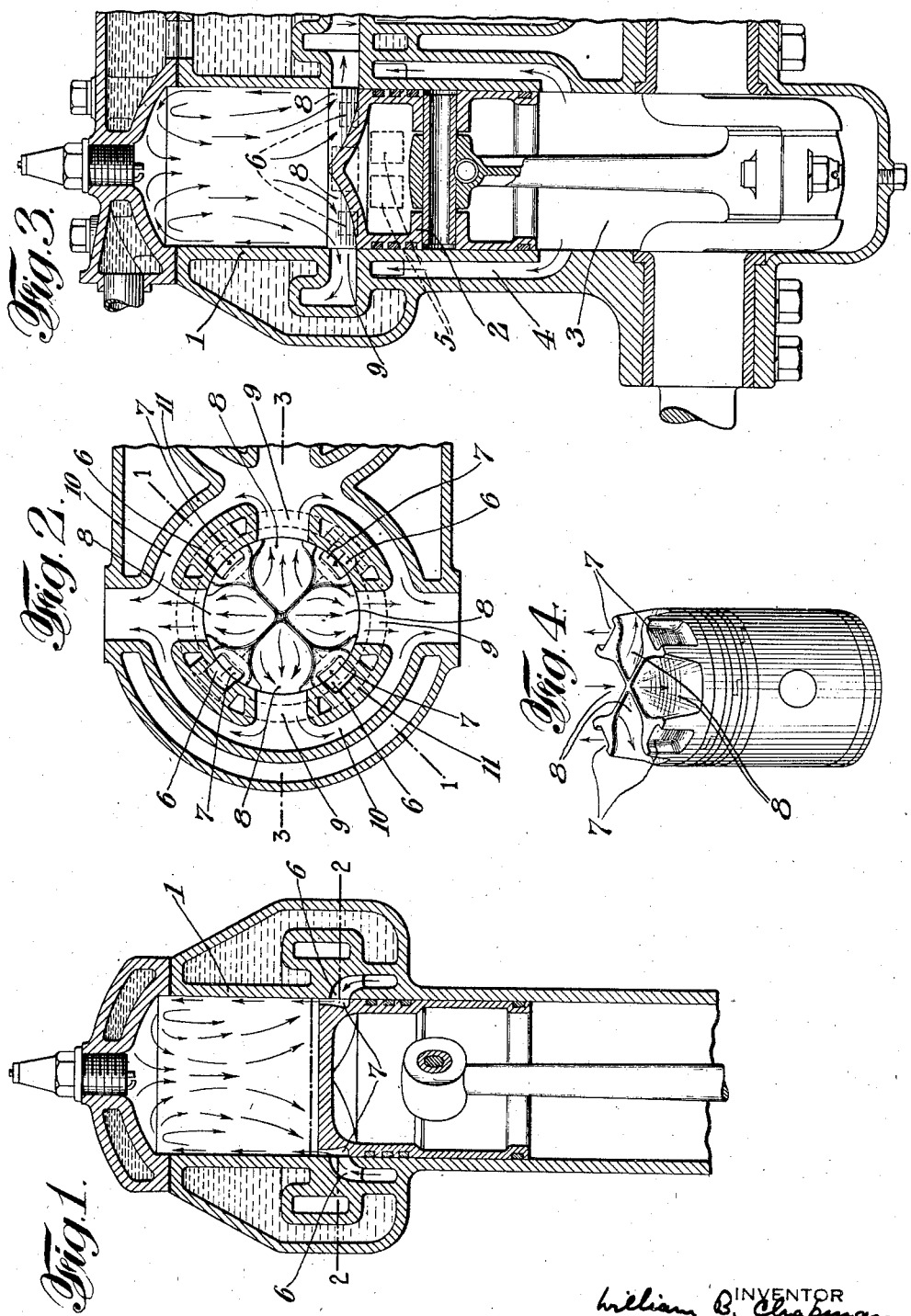

1,744,446

UNITED STATES PATENT OFFICE

WILLIAM B. CHAPMAN, OF JACKSON HEIGHTS, NEW YORK

TWO-CYCLE INTERNAL-COMBUSTION ENGINE

Application filed May 1, 1928. Serial No. 274,209.

The invention relates to internal combustion engines, particularly of the two cycle type, wherein the difficulty involved in proper scavenging the cylinder of burned gases and admitting a fresh charge, during the short period in the cycle of the engine which may be given up to the above operations, has largely impaired the capacity, efficiency and reliability of the two cycle engine.

One important object of the present invention is to increase capacity and efficiency by improving the scavenging and charge-admitting operations, particularly by producing gaseous currents within the cylinder which will be symmetrical with regard to the space to be scavenged and charged, thereby insuring that all parts of the cylinder space will be substantially uniformly and completely scavenged and refilled with a fresh charge, and eddy currents or dead pockets in the cylinder will be avoided, the above operations being so carried out as to avoid undue heating either of the incoming charge or the piston head.

Further objects and advantages of the invention will be in part obvious and in part specifically pointed out in the description hereinafter contained which, taken in conjunction with the accompanying drawings, discloses certain preferred embodiments of the invention; such embodiments, however, are to be considered merely as illustrative of its principles. In the drawings—

Fig. 1 is a central longitudinal section through the cylinder and piston of an engine constructed to operate in accordance with the invention, the section being taken on line 1—1 of Fig. 2.

Fig. 2 is a transverse section on line 2—2 of Fig. 1.

Fig. 3 is a view similar to Fig. 1 but taken on line 3—3 of Fig. 2.

Fig. 4 is a perspective view showing the piston head construction.

The invention is illustrated as applied to an engine having a cylinder 1 and piston 2, a crank case 3 being shown (Fig. 3) as adapted to supply fresh gaseous charges through passageways 4 to the inlet ports hereinafter described, in the manner usual with two cycle engines. Suitable inlet openings 5 for the crank case are indicated in dotted lines in Fig. 3.

In accordance with the present invention I provide the head portion of the piston with channels for the gases entering and leaving the cylinder space, which direct these gases into streams passing longitudinally of the cylinder, one or more of such streams passing longitudinally along the cylinder wall, and the other stream passing centrally through the cylinder in the opposite direction, the channels being located exteriorly of the piston as later described to avoid overheating effects either upon the gases or the piston.

In the illustrated form of the invention the incoming gases are conducted from passageways 4 to inlet ports 6 in the cylinder wall and the piston 2 is provided with a corresponding number of inlet channels 7 which direct the incoming gases into a plurality of streams passing along the cylinder wall toward its head, and so confined as to cause the streams to be restricted in cross sectional area and to travel at a sufficiently high velocity to penetrate through the old gaseous charge and reach the head end of the cylinder. The total inlet channel cross sectional area may be, for example, about one-twentieth of the total cross sectional area of the exhaust channels hereinafter described.

After reaching the head end of the cylinder the gases turn and pass back centrally through the cylinder until they reach the piston head, where they are directed by exhaust channels 8 to a plurality of exhaust ports 9 in the cylinder wall.

I prefer to stagger the inlet and exhaust ports 6 and 9 symmetrically around the cylinder wall, which results in a construction of piston head which is symmetrical about the longitudinal axis of the piston, and also a flow of gases through the cylinder which is symmetrical about said axis, which results in a more uniform scavenging action as well as uniform refilling with a fresh charge.

The channels 7 and 8 being located exteriorly on the head portion of the piston, do not form any covered pockets in the piston.

I have found that if the incoming gases be led through interior passageways in the piston, the explosion heats up the adjacent parts of the piston unduly and causes too much expansion of the gases as they enter the cylinder space, and preignition if an explosive mixture is so admitted, while if the exhaust gases are led through covered passageways in the piston, the adjacent walls of the piston also will be overheated, particularly such parts of the walls as are interposed between the passageways and the cylinder space proper, and are therefore subjected to heat on both their top and bottom surfaces.

I prefer also to locate the inlet and exhaust ports at substantially the same level in the cylinder wall, although as indicated in Fig. 3, the exhaust ports are made somewhat larger and open somewhat before the inlet ports. As shown in Fig. 2, the cylinder may be provided with an annular exhaust chamber 10 into which the exhaust ports 9 open, and the inlet ports may be led up from passageways 4 through the cylinder wall sectors 11 which are interposed between the exhaust ports. This feature of construction locates the inlet and exhaust passageways 7 and 8 of the piston in substantially the same transverse plane across the piston head, and enables a short piston head to be employed. It will also be noted that the channels 8 are adapted to divide the cylinder space into several substantially distinct compartments when the piston is near the head end of the cylinder. This is of advantage in Diesel engines of either the two or four cycle type, larger sizes of this type of engine being now provided with multi-jet fuel injection to afford more uniform ignition. A piston as illustrated in Fig. 4 will provide four separate compartments disposed symmetrically about the longitudinal axis of the piston, into each of which fuel may be injected.

The symmetrical arrangement of inlet and outlet ports above described is also advantageous in engines of the Diesel type. The great amount of heat developed in Diesel engines when operated under high loads has heretofore caused unequal expansion of the metal in the engine due to the unbalanced arrangement of the inlet and exhaust ports. The symmetrical arrangement above described will produce substantially uniform expansion around the central axis of the cylinder, permitting the engine to operate safely at higher loads.

While a specific embodiment of the invention has been disclosed it will be obvious that many changes may be made therein without departing from its general features as set forth in the appended claims.

I claim:

1. A two cycle internal combustion engine cylinder, a piston working therein, said piston having upon its head surface a plurality of substantially radially disposed ridges making substantially equal angles with each other, a plurality of intake channels located in the exterior of the piston respectively adjacent the ends of said ridges, and the surfaces of the cylinder lying between said ridges being shaped to provide exhaust channels of relatively large cross sectional area and leading from the central portion of the piston to its periphery, said cylinder having inlet and exhaust ports adapted to communicate respectively with the inlet and exhaust channels.

2. A two cycle internal combustion engine cylinder, a piston working therein, said piston having upon its head surface a plurality of substantially radially disposed ridges making substantially equal angles with each other, a plurality of intake channels located in the exterior of the piston respectively adjacent the ends of said ridges, and the surfaces of the cylinder lying between said ridges being shaped to provide exhaust channels of relatively large cross sectional area and leading from the central portion of the piston to its periphery, said cylinder having inlet and exhaust ports adapted to communicate respectively with the inlet and exhaust channels, said cylinder being provided with an annular exhaust passageway communicating respectively with said exhaust ports and an annular inlet passageway located at a different level from said passageway communicating with said inlet ports at points between said exhaust ports and at substantially the same level as the latter.

3. In combination, a two cycle internal combustion engine, a piston working therein, said piston having inlet and exhaust channels both lying in its exterior surface adjacent the head end of the piston for directing the inlet and the exhaust gases, the inlet channels being peripherally disposed and the exhaust channels running substantially radially, said respective sets of channels being staggered around the periphery of the piston and being substantially symmetrically arranged in such manner that each exhaust channel makes substantially equal angles with different exhaust channels disposed on opposite sides thereof, and with the respective inlet channels disposed substantially mid-way between each pair of adjacent exhaust channels.

In testimony that I claim the foregoing, I have hereunto set my hand this 24th day of April, 1928.

WILLIAM B. CHAPMAN.